April 19, 1932.  G. H. JACKSON  1,854,741
TRAILER AND MEANS FOR COUPLING IT TO MOTOR VEHICLES
Filed May 2, 1931  2 Sheets-Sheet 2
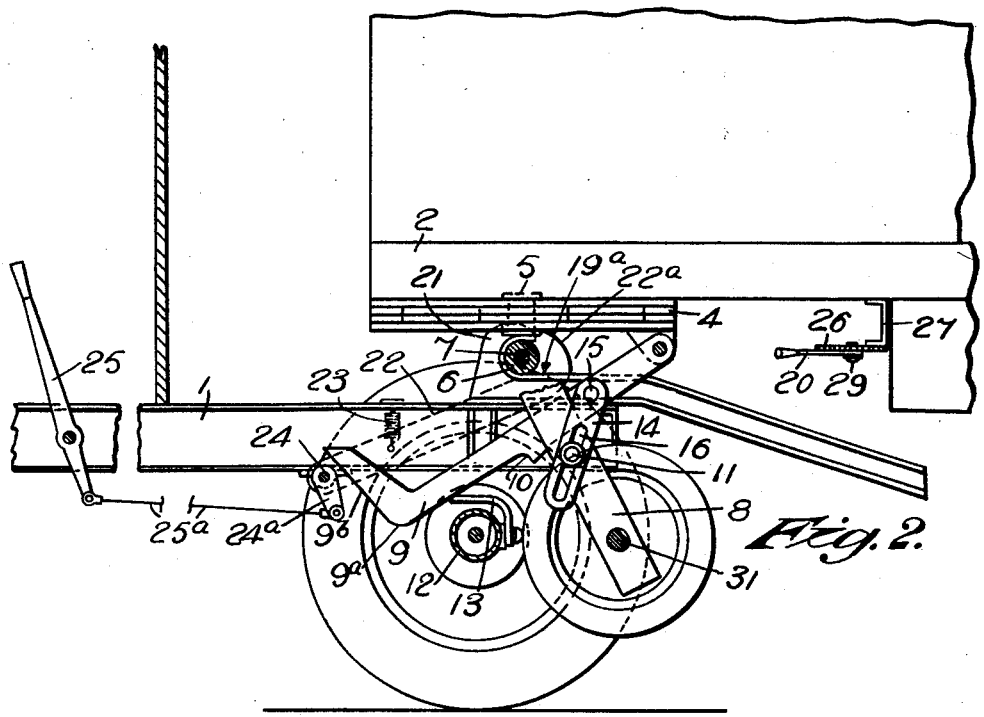
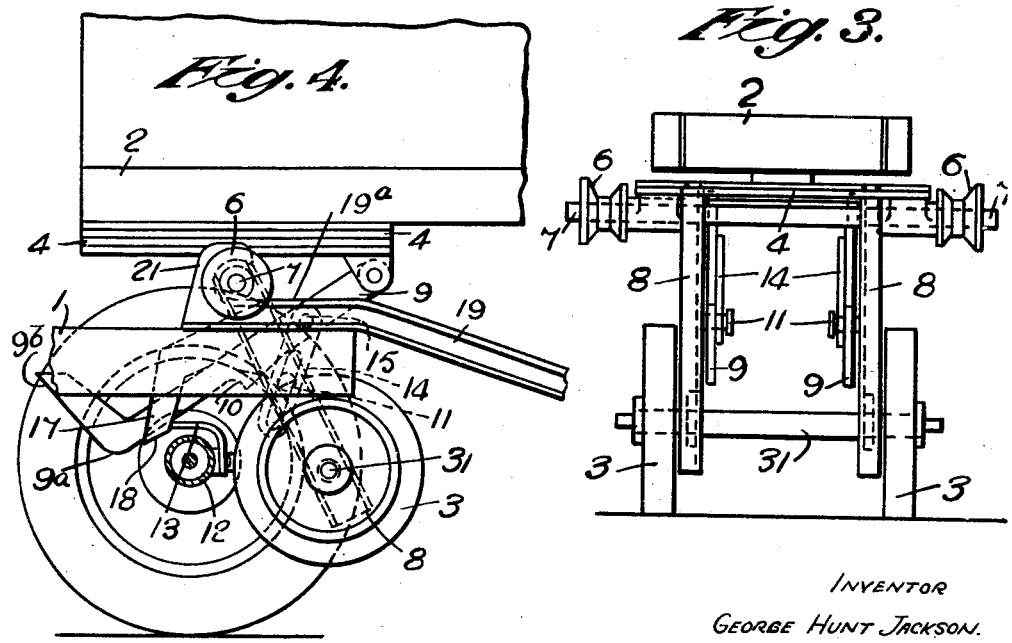
INVENTOR
GEORGE HUNT JACKSON.
PER Rayner & Co
ATTORNEYS.

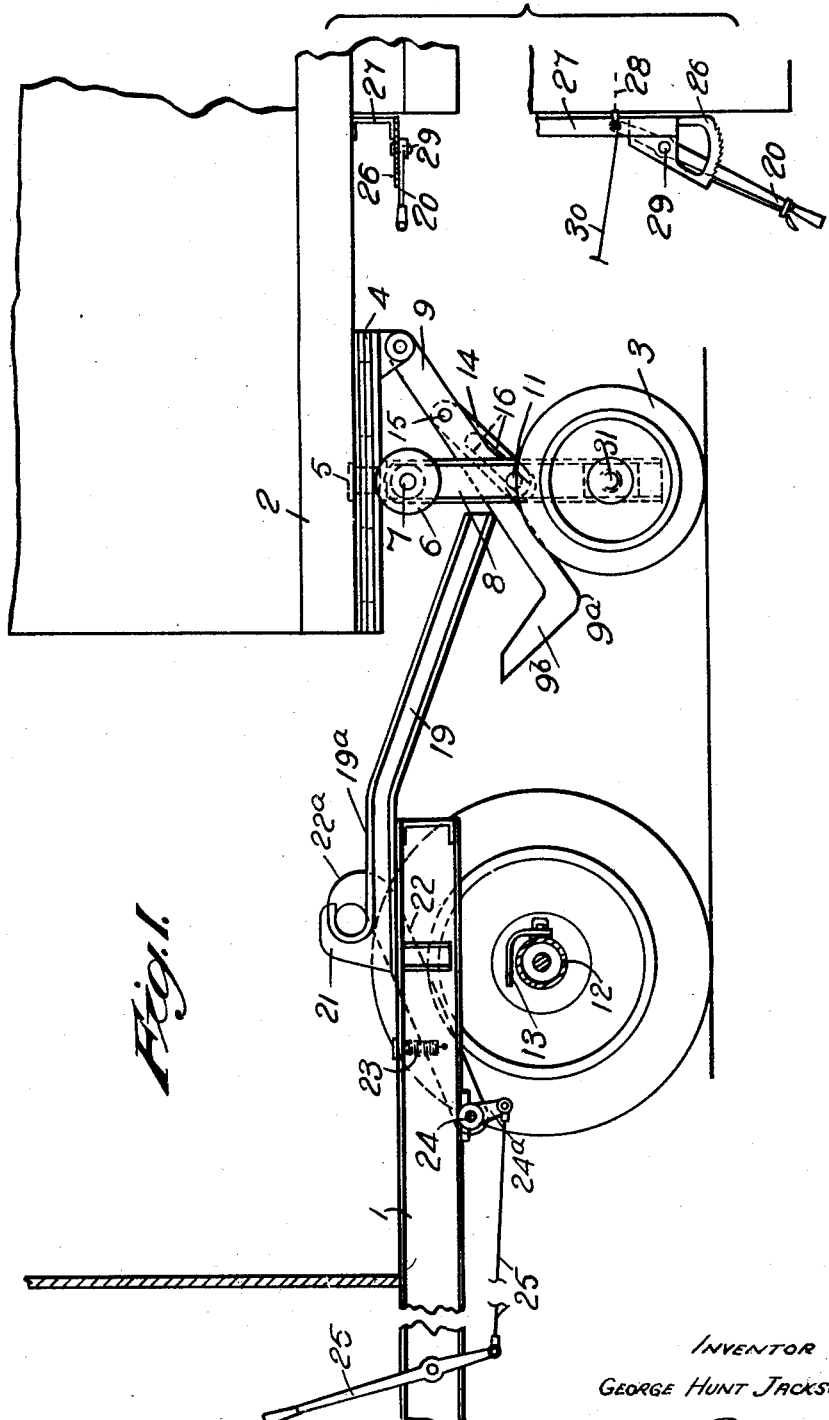

Patented Apr. 19, 1932

1,854,741

UNITED STATES PATENT OFFICE

GEORGE HUNT JACKSON, OF ENFIELD, ENGLAND

TRAILER AND MEANS FOR COUPLING IT TO MOTOR VEHICLES

Application filed May 2, 1931. Serial No. 534,600.

This invention relates to improvements in trailers for motor vehicles and means for coupling the tractor and trailer portion of the vehicle together.

The object of this invention is to provide a construction and arrangement of trailer and means for coupling it to a motor vehicle to act as a tractor so that the coupling operation may be effected by simply bringing the two portions of the vehicle together, for example by backing the tractor into engagement with the trailer. Alternatively, means is provided for disengaging the coupling device so that the tractor portion of the vehicle may be drawn away from the trailer which will be left standing, a suitable auxiliary wheel or a pair of wheels being provided to support the forward portion of the trailer when uncoupled from the tractor.

Broadly my present invention is characterized by a member movably carried by the trailer and serving as a stop locking the front wheels of the trailer in operative position and adapted upon bringing the tractor and trailer together for coupling them to engage a part of the tractor and thereby become moved to release the said front wheels, said wheels being raised upon completion of the coupling of the two vehicles and lowered and locked with said member upon separation of the two vehicles.

According to an embodiment of my invention a locking member is provided in conjunction with a swinging support for the bogey or equivalent wheels of a trailer, the said locking member being adapted to hold the said wheels in the supporting position and being adapted upon coupling of the tractor and trailer to be automatically moved to release the said swinging support, means being provided whereby upon completion of the coupling of the two vehicles the said wheels are automatically raised clear of the road, and upon uncoupling the vehicles and separating them the said swinging support permits the wheels to swing into contact with the road and the said locking member effects a locking action on the said swinging support.

In the preferred form of this invention the rear end of the tractor chassis is provided with a pair of ramp rails and the trailer is provided with a turntable from which depends a frame supporting the front wheels of the trailer, the said frame pivoting about an axis diametrical with respect to said turntable, a swinging locking arm being pivoted to a convenient part of the trailer and formed with an abutment adapted to engage an abutment on said frame to prevent the frame from swinging rearwards about said axis, the said locking arm having a free end adapted to ride over a member on the tractor upon moving the tractor and trailer together whereby the locking arm is raised to separate the said abutments, the said ramp rails being engaged by a pair of rollers or runners on the trailer and being provided with means to automatically couple the tractor and trailer when said rollers or runners reach stops at the front ends of said ramp rails, the said wheel carrying frame being swung rearwards and upwards upon separation of said abutments.

In carrying into practice this preferred form of my invention trailers for motor vehicles and coupling means for connecting them to the rear portion of a motor vehicle to act as a tractor are arranged with a turntable at the forward end of the trailer provided with transverse projections or trunnions on opposite sides of the turn-table adapted to be engaged and to be lifted by inclined ramps at the rear of the tractor. Auxiliary wheels are suspended and supported on pivoted arms connected to the turn-table or other convenient part of the trailer, and these are preferably arranged to pivot around the trunnions on the turn-table which engage the ramps on the tractor. When the trailer is uncoupled from the tractor, these arms with their wheels are held in position directly beneath the turn-table so as to support the forward end of the trailer. When the tractor is engaged with and lifts the forward end of the trailer from the ground then the arms are released and are turned about their pivotal connections so as to raise them well above the ground where they are held by suitable means. A suitable stop or stops or pivoted and slotted links may act as stops or combined stops and stays to retain the auxiliary wheels and their arms rigidly in the required position to support the forward end of the trailer when disengaged from the tractor.

A suitable pivoted link or links is or are provided on the tractor to engage over a projection or projections on the turn-table. These are coupled to a suitable hand lever by the operation of which they may be released so as to permit the trailer being uncoupled from the tractor. The coupling operation may be performed by backing the tractor against the trailer so that the ramps engage beneath the projection on the turn-table of the trailer supporting the front thereof and moving relatively to the trailer until the pivoted catches on the tractor engage over the trunnions on the turn-table and automatically couple the tractor and trailer together.

The auxiliary supporting wheels for the front of the trailer are moved positively being lifted away from the ground when the trailer is supported by the tractor during coupling and allowed to fall back or pulled or pushed back into position to support the front of the trailer before it is completely uncoupled from the tractor.

In order that my invention may be clearly understood and readily carried into effect, I have appended hereto a sheet of drawings illustrating an embodiment thereof and wherein:—

Fig. 1 is a part sectional side elevation view of the relevant parts of a tractor and trailer showing them uncoupled.

Fig. 2 is a part sectional side elevation view showing the tractor and trailer coupled.

Fig. 3 is a front elevation view of the trailer uncoupled.

Fig. 4 is a detail side elevation view showing a suitable arrangement of device for positively moving the front wheels of the trailer into contact with the road upon separating the two vehicles.

Referring to the drawings the apparatus shown for coupling and uncoupling a tractor 1 and trailer 2 and for bringing into and out of contact with the road a pair of auxiliary or front trailer wheels 3 employs a turn-table 4 mounted beneath the forward end of the trailer 2 and adapted to swivel about a suitable king pin 5 connected to the trailer. Upon opposite sides of this turn-table are provided substantially radial projections or trunnions 6 mounted on a shaft 7 diametrical with and fixed in relation to the turn-table 4 and upon portions of which are pivoted a pair of hinged arms 8, the lower ends of which carry the auxiliary wheels 3 adapted to rest upon the ground and support the front of the trailer when not coupled to a tractor. These arms 8 are arranged to be locked in a substantially vertical position below the turn-table by means of a pair of locking bars 9 having steps, notches or recesses 10, hereinafter referred to as steps, formed therein to engage a pair of lateral projections 11 on the arms 8 or a transverse bar connecting the two arms 8 and adapted thereby to retain the wheels 3 in the lowered position for supporting the trailer. The forward ends of these two bars 9 are suitably shaped to engage against the rear axle casing 12 or as shown a metal cam or spring plate 13 on such axle casing during the coupling operation so as to release the locking bars as shown in Fig. 2 and permit the arms 8 with the auxiliary supporting wheels 3 to swing about the shaft 7 of the trunnions 6 so that the wheels 3 will be raised clear of the ground. Suitable stops for locating the auxiliary wheels in the supporting position may comprise a stout angle bar extending across the underside of the turn-table at such a position that the arms will butt against it when in the lowered position. In addition or as an alternative to such stops suitable slotted links 14 may be pivoted at one end to the bars 9 by pivot pins 15, their slots 16 sliding along the lateral projections 11 of the arms 8, such projections having flanged heads to engage the inner sides of the links 14. It will be seen that the links 14 act as stays for the arms 8 and permit them to be raised in the manner described but will limit their return movement and act as stays to retain them in position.

In order to effect a positive movement of the auxiliary wheels and to ensure that they will always be brought into position to support the front of the trailer during the uncoupling operation suitable forwardly projecting horns or equivalent shaped members may as shown in Fig. 4 be provided on the arms carrying the auxiliary wheels arranged so that the tractor axle or other suitable part thereof will engage with the horns whilst the arms are being pushed back to raise the auxiliary wheels. For this purpose a pair of plates 17 can be fixed to the arms 8 and formed with cam like inclined edges 18 on their lower edges adapted to ride over the cam plate 13 so that when the two vehicles are coupled the intermediate part of the edge 18 rests on or near the plate 13, but when the two vehicles are being separated the front inclined parts of the edges 18 are drawn over the plate 13 resulting in either a positive downward pull on the arms 8 or a sufficient start to ensure them falling to the supporting position. It will be seen that as the arms 8 swing about their pivots the plates 17 will engage round the axle plate 13 or other suitable part so that during uncoupling the forward movement of the tractor will act to positively move the arms and the auxiliary wheels back into position to support the forward end of the trailer. The rear end of the tractor 1 is provided with downwardly curved or inclined ramps 19 extending in a rearward direction and adapted to engage beneath the transverse trunnions 6 on opposite sides of the turn-table 4 of the trailer. Suitable brakes are provided on the trailer rear wheels and a hand lever 20 or other means may be provided on a convenient part of the trailer for applying these brakes so that the trailer will be held stationary whilst the tractor is backed against it to perform the coupling operation. The rear end of the ramps 19 on the tractor are sufficiently low to engage beneath the trunnions 6 on the turn-table of the trailer when the tractor is backed against it. Since the trailer wheels are locked by the brakes described further backing of the tractor will cause the trunnions 6 to run up the inclined faces of the ramps 19 lifting the front end of the trailer. The trunnions 6 are preferably formed as grooved rollers to ensure a proper guidance along the ramps 19 which are preferably metal rails or girders. At their forward ends the ramps are formed with horizontal parts 19a the front ends of which are formed with suitable upstanding stops 21 to limit the extent to which the ramps may engage beneath the trunnions and before reaching this position the trunnions will engage cam-like arcuate rear faces 22a of pivoted hook-like levers 22 which are thus lowered and engaged over the trunnions so as to retain them in position on the ramps. Suitable coiled springs 23 or other means may be provided to ensure proper engagement of the hook-like catches to retain them in position. These hook-like catches may be mounted upon a transverse shaft 24 carrying a crank 24a connected by a cable or rod 25a to a suitable hand or other lever 25 which may be arranged to project into the driver's compartments and by which the arms 22 may be turned about their pivots so as to release the trunnions when it is desired to uncouple the trailer from the tractor.

The arms 8 carrying the auxiliary wheels by which the forward end of the trailer is supported when not coupled to a tractor are preferably arranged in the form of a pivoted frame comprising two side arms with forwardly projecting horns as previously described, pivoted round the shaft 7 on the turn-table of the trailer and connected together at their lower ends by means of an axle 31 on which the auxiliary wheels 3 are supported. The forward end of one or both locking bars 9 are specially shaped to engage the axle of the tractor during the coupling operation. For this purpose they have a downwardly directed nose or cam-like corner 9a with an inclined forward face 9b so that when the axle of the tractor engages this frame the arms will be lifted thus unlocking the pivoted arms carrying the auxiliary wheels. Further rearward movement of the tractor will cause the plate 13 or axle 12 or other suitable part thereof to engage the plates 17 turning the arms 8 about the shaft 7 until the wheels 3 are raised a sufficient distance above the ground. The side arms 8 will then be inclined in a rearward and downward direction as shown in Fig. 2 and the edges 18 of the plates 17 will be engaged round or near the axle or other part. The completion of the coupling operation is performed by continuing to back the tractor until the members 6 are engaged under the pivoted catches 22 so as to secure the turn-table on the upper forward end of the ramps on the tractor.

In the reverse operation of uncoupling a trailer from its tractor, the brakes are applied to the trailer wheels, the driver takes his place in the driving compartment of the tractor and operates the lever 25 to raise the pivoted catches 22 from the trunnions on the trailer turn-table. He then drives the tractor slowly in a forward direction. Since the trailer will remain stationary owing to the fact that its brakes are applied the tractor will gradually move forward away from the trailer and the members 6 on the turn-table will be gradually lowered as the ramps 19 are drawn away beneath them. In the meantime the arms 8 will be turned about the shaft 7 owing to the engagement of the axle with the edges 18 of the plates 17 on the arms 8 so that the auxiliary wheels will be positively moved back into position to support the front of the trailer when they come into contact with the ground as the ramps on the tractor are withdrawn from beneath the members 6 on the trailer turn-table. When the noses 9a on the locking bars 9 have passed over the axle 12 of the tractor the bars 9 will again so fall that their step 10 will engage the lateral members 11 of the pivoted arms 8 and will thus lock the supporting wheels in position beneath the turn-table. The tractor and trailer will now be completely disconnected and the forward end of the trailer will be safely supported upon the auxiliary wheels 3 which are locked in position beneath it whilst the trailer itself will be held against motion by the brake applied to its wheels.

This lever is operatively connected by a rod or cable 28 to the appropriate brakes and it may rotate on a bolt or pivot pin 29.

The brake rod or cable 28 may be disconnected when desired from the lever 20 and its free end coupled to a cable 30 leading to the usual foot brake mechanism in the driver's cab or to a separate lever on the tractor.

My improved arrangement of trailer and means for coupling it to a tractor and for uncoupling it therefrom and supporting it on the ground by auxiliary wheels when so uncoupled enables the coupling and uncoupling operations to be performed readily and with certainty entirely by the driver of the tractor and without assistance. The arrangement provides a positive and effective method of coupling the trailer to the tractor and simple and effective means for releasing the trailer when so desired. Whilst capable of being designed and arranged in forms suitable for application to almost any standard motor vehicles it is particularly intended for and adapted to be applied to Ford motor trucks. The arrangement provides a cheap form of vehicle and enables a tractor to operate in conjunction with a considerable number of trailer units whilst the coupling and uncoupling operations may be simply and positively performed without employing other labour than that of the driver of the tractor.

It is of course understood that in referring to the auxiliary wheels 3 I contemplate the obvious mechanical equivalent of only one auxiliary wheel located in line with the longitudinal centre of the trailer, it being apparent that such a wheel could be mounted on the centre of the axle 31.

I claim:—

1. A trailer and tractor and means for coupling and uncoupling them comprising at the rear end of the tractor chassis a pair of ramp rails and at the front end of the trailer a turn-table, a frame depending from said turntable and supporting the front wheels of the trailer, the said frame pivoting about an axis diametrical with respect to said turn-table, a swinging locking arm pivoted to a convenient part of the trailer, an abutment formed on said arm, an abutment on said frame, the two abutments being automatically engaged upon coupling of the two vehicles to prevent the frame from swinging rearwards about said axis, a free end to said locking arm adapted to ride over a part of the tractor upon moving the tractor and trailer together whereby the locking arm is raised to separate the said abutments, a pair of runners on the trailer engaging said ramp rails, and means to automatically couple the tractor and trailer when said rollers or runners reach the front ends of said ramp rails, stops at the front end of said rails, the said wheel carrying frame being swung rearwards and upwards upon separation of said abutments.

2. A trailer and tractor means for coupling and uncoupling them comprising at the rear end of the tractor chassis a pair of ramp rails and at the front end of the trailer a turn-table, a frame depending from said turntable and supporting the front wheels of the trailer, the said frame pivoting about an axis diametrical with respect to said turn-table, a swinging locking arm pivoted to a convenient part of the trailer, an abutment formed on said arm, an abutment on said frame, the two abutments being automatically engaged upon coupling of the two vehicles to prevent the frame from swinging rearwards about said axis, a free end to said locking arm adapted to ride over a part of the tractor upon moving the tractor and trailer together whereby the locking arm is raised to separate the said abutments, a pair of runners on the trailer engaging said ramp rails, means to automatically couple the tractor and trailer when said rollers or runners reach the front ends of said ramp rails, stops at the front end of said rails, the said wheel carrying frame being swung rearwards and upwards upon separation of said abutments, inclined parts on said ramp rails merging forwardly into substantially horizontal parts of the rails and terminated by said stops against which said runners engage upon completion of the coupling of the two vehicles, a spring loaded coupling catch being located in juxtaposition to one of said stops under each of which one of said runners or rollers is adapted to trip.

3. In a trailer and tractor and means for coupling and uncoupling them, an arm for locking the front wheels of the trailer in their supporting position, a turntable to which said arm is pivoted so as to extend forwardly and downwardly therefrom, a swinging frame connected to said turntable, front trailer wheels carried by said frame, a notch in said arm and a projection on said frame, the one engaging the other to lock the frame in the trailer supporting position, and an upwardly inclined lower edge at the free end of said arm adapted to ride over a part of the tractor to effect raising of said arm and separation of said notch and projection.

4. In a trailer and means for coupling it to a tractor, a swinging support for the front wheels of the trailer, a locking member provided in conjunction with said swinging frame, the said locking member being adapted to hold the said wheels in the supporting position and being adapted upon coupling of the tractor and trailer to be automatically moved to release the said swinging frame, means automatically raising said front wheels clear of the ground upon completion of the coupling of the two vehicles by said swinging support and upon uncoupling the vehicles and separating them permitting the wheels to swing into contact with the road, the said locking member effecting a locking action on the said swinging frame, and a slotted link slidably receiving a projection on said frame to limit forward swinging movement of said frame.

5. A trailer and tractor and means for coupling and uncoupling them comprising at the rear end of the tractor chassis a pair of ramp rails and at the front end of the trailer a turntable, a frame depending from said turntable and supporting the front wheels of the trailer, the said frame pivoting about an axis diametrical with respect to said turntable, a swinging locking arm pivoted to a convenient part of the trailer, an abutment formed on said arm, an abutment on said frame, the two abutments being automatically engaged upon coupling of the two vehicles to prevent the frame from swinging rearwards about said axis, a free end to said locking arm adapted to ride over a part of the tractor upon moving the tractor and trailer together whereby the locking arm is raised to separate the said abutments, a pair of runners on the trailer engaging said ramp rails, means to automatically couple the tractor and trailer when said rollers or runners reach the front ends of said ramp rails, stops at the front end of said rails, the said wheel carrying frame being swung rearwards and upwards upon separation of said abutments, and a slotted link pivoted to said arm slidably receiving a projection on said frame to limit forward swinging movement of said frame and permitting rearward swinging movement of said frame upon separation of said abutments.

6. A trailer and tractor and means for coupling and uncoupling them comprising at the rear end of the tractor chassis a pair of ramp rails and at the front end of the trailer a turntable, a frame depending from said turntable and supporting the front wheels of the trailer, the said frame pivoting about an axis diametrical with respect to said turntable, a swinging locking arm pivoted to a convenient part of the trailer, an abutment formed on said arm, an abutment on said frame, the two abutments being automatically engaged upon coupling of the two vehicles to prevent the frame from swinging rearwards about said axis, a free end to said locking arm adapted to ride over a part of the tractor upon moving the tractor and trailer together whereby the locking arm is raised to separate the said abutments, a pair of runners on the trailer engaging said ramp rails, means to automatically couple the tractor and trailer when said rollers or runners reach the front ends of said ramp rails, stops at the front end of said rails, the said wheel carrying frame being swung rearwards and upwards upon separation of said abutments, and means for automatically positively moving the front wheels down into supporting position upon uncoupling the two vehicles.

7. In a trailer and tractor and means for coupling and uncoupling them, an arm for locking the front wheels of the trailer in their supporting position, a turntable to which said arm is pivoted so as to extend forwardly and downwardly therefrom, a swinging frame connected to said turntable, front trailer wheels carried by said frame, a notch in said arm and a projection on said frame, the one engaging the other to lock the frame in the trailer supporting position, an upwardly inclined lower edge at the free end of said arm adapted to ride over a part of the tractor to effect raising of said arm and separation of said notch and projection, and means for automatically positively moving the front wheels down into supporting position upon uncoupling the two vehicles, said means also serving to positively raise the said wheels upon coupling the two vehicles.

8. A trailer and tractor and means for coupling and uncoupling them comprising at the rear end of the tractor chassis a pair of ramp rails and at the front end of the trailer a turntable, a frame depending from said turntable and supporting the front wheels of the trailer, the said frame pivoting about an axis diametrical with respect to said turntable, a swinging locking arm pivoted to a convenient part of the trailer, an abutment formed on said arm, an abutment on said frame, the two abutments being automatically engaged upon coupling of the two vehicles to prevent the frame from swinging rearwards about said axis, a free end to said locking arm adapted to ride over a part of the tractor upon moving the tractor and trailer together whereby the locking arm is raised to separate the said abutments, a pair of runners on the trailer engaging said ramp rails, means to automatically couple the tractor and trailer when said rollers or runners reach the front ends of said ramp rails, stops at the front end of said rails, the said wheel carrying frame being swung rearwards and upwards upon separation of said abutments, inclined parts on said ramp rails merging forwardly into substantially horizontal parts of the rails and terminated by said stops against which said runners engage upon completion of the coupling of the two vehicles, a spring loaded coupling catch being located in juxtaposition to one of said stops under each of which one of said runners or rollers is adapted to trip, and a plate projecting from said frame for effecting a positive lowering of the front wheels, an upwardly inclined lower edge portion on said plate adapted to ride over a part of the tractor.

9. A trailer and tractor and means for coupling and uncoupling them comprising at the rear end of the tractor chassis a pair of ramp rails and at the front end of the trailer a turntable, a frame depending from said turntable and supporting the front wheels of the trailer, the said frame pivoting about an axis diametrical with respect to said turntable, a swinging locking arm pivoted to a convenient part of the trailer, an abutment formed on said arm, an abutment on said frame, the two abutments being automatically engaged upon coupling of the two vehicles to prevent the frame from swinging rearwards about said axis, a free end to said locking arm adapted to ride over a part of the tractor upon moving the tractor and trailer together whereby the locking arm is raised to separate the said abutments, a pair of runners on the trailer engaging said ramp rails, means to automatically couple the tractor and trailer when said rollers or runners reach the front ends of said ramp rails, stops at the front end of said rails, the said wheel carrying frame being swung rearwards and upwards upon separation of said abutments, a slotted link pivoted to said arm slidably receiving a projection on said frame to limit forward swinging movement of said frame, and permitting rearward swinging movement of said frame upon separation of said abutments, and means for automatically positively moving the front wheels downwards upon uncoupling the two vehicles.

10. In a trailer and means for coupling it to a tractor, a swinging support for the front wheels of the trailer, a locking arm intersecting said support and pivoted at its upper end to the trailer in rear of said support, the said locking arm extending forwards beyond the said support and an abutment on the tractor adapted to be engaged by said locking arm to swing the arm forwardly and another abutment adapted to swing the said support rearwardly when the tractor and trailer are coupled, co-operating locking abutments on the arm and support adapted to maintain said support in the supporting position but disengaged consequent upon said swinging movements, and a link connecting the said arm and support by a pin and slot connection preventing forward swinging movement of said support but permitting rearward swinging movement thereof.

GEORGE HUNT JACKSON.